M. Berdan,
Subsoil Plow.

No. 83,030.  Patented Oct. 13, 1868

WITNESSES:
Wm A. Morgan
G. C. Colton

INVENTOR:
M. Berdan
per
Murry
att

M. BERDAN, OF MAUMEE CITY, OHIO.

Letters Patent No. 83,030, dated October 13, 1868.

IMPROVEMENT IN PLOWS.

The Schedule referred to in these Letters Patent and making part of the same.

*To all whom it may concern:*

Be it known that I, M. BERDAN, of Maumee City, in the county of Lucas, and State of Ohio, have invented a new and useful Improvement in Plows; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new and improved means for attaching a subsoil-share to an ordinary plow, whereby said share may be adjusted higher or lower, as desired, and held very firmly in position when adjusted.

In the accompanying sheet of drawings A represents the beam of a plow, B B the handles, C the mould-board, and D the landside of an ordinary plow. The parts being old and well known, do not require a minute description.

The handles B B are connected by a rod, E, on which a screw is cut. This screw-rod passes through an oblong slot, $a$, in a bar, F, and on said screw-rod there is a nut, $b$, at one side of the bar F; a nut, $c$, provided with a handle, $d$, also being on the rod E, at the opposite side of bar F.

By screwing up the nut $c$ against the bar F, the latter will be firmly clamped between the two nuts, and, in consequence of the oblong slot $a$, the bar F may be adjusted higher or lower, and secured at the desired point by screwing up the nut $c$, as above specified.

Figure 1:
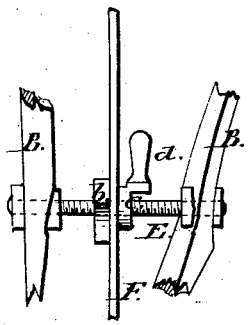
Figure 1 is a rear view of a portion of my invention.
Figure 2:
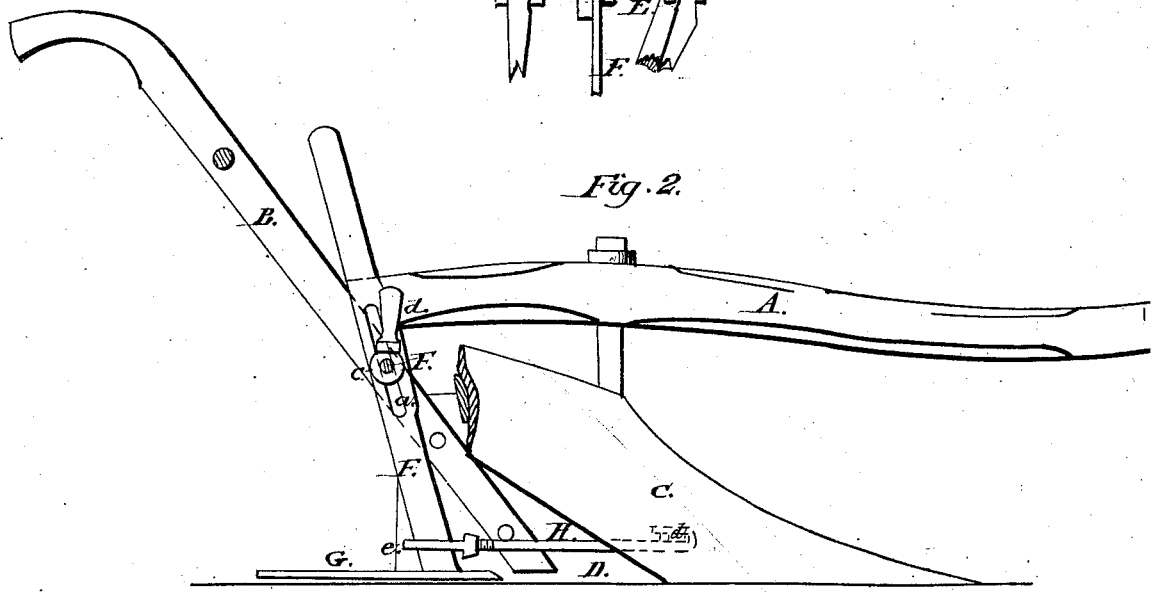
Figure 2 is a side view of the same, partly in section.
Figure 3:
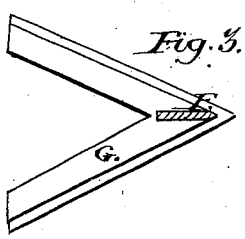
Figure 3 is a detached plan or top view of the subsoil-share.

The bar F has a subsoil-share, G, attached to its lower end. This share is of V-form, as shown clearly in fig. 3, and is located at the rear of the plow, so as to act upon the soil at the bottom of the furrow made by the mould-board C.

The bar F is stayed by a rod, H, the front end of which is bent in hook-form, to catch over a cross-bar, $d$, between the mould-board and landside, and on the rear end of the rod H there is cut a screw thread, on which a link, $e$, is fitted, through which link the bar F passes.

By this arrangement it will be seen that the bar F, and consequently the share G, may be adjusted higher or lower, as desired, and the bar firmly held or retained in position at any point of its adjustment.

Having thus described my invention,

I claim as new, and desire to secure by Letters Patent—

The slotted bar F, and screw-rods E and H, so arranged that the share G can be adjusted both vertically, laterally, and longitudinally, as specified.

The above specification of my invention signed by me, this 19th day of June, 1868.

M. BERDAN.

Witnesses:
ABRAHAM PECK,
J. VAN FLEET.